US011970838B2

(12) United States Patent
Sugiki et al.

(10) Patent No.: US 11,970,838 B2
(45) Date of Patent: Apr. 30, 2024

(54) CONSTRUCTION MACHINE

(71) Applicant: Hitachi Construction Machinery Co., Ltd., Tokyo (JP)

(72) Inventors: Shohei Sugiki, Kasumigaura (JP); Kenji Hiraku, Kasumigaura (JP); Hiromasa Takahashi, Abiko (JP); Teppei Saitoh, Mito (JP); Juri Shimizu, Hitachinaka (JP)

(73) Assignee: Hitachi Construction Machinery Co., Ltd, Tokyo (JP)

(*) Notice: Subject to any disclaimer, the term of this patent is extended or adjusted under 35 U.S.C. 154(b) by 165 days.

(21) Appl. No.: 17/637,225

(22) PCT Filed: Aug. 25, 2020

(86) PCT No.: PCT/JP2020/032072
§ 371 (c)(1),
(2) Date: Feb. 22, 2022

(87) PCT Pub. No.: WO2021/039805
PCT Pub. Date: Mar. 4, 2021

(65) Prior Publication Data

US 2023/0349132 A1 Nov. 2, 2023

(30) Foreign Application Priority Data

Aug. 26, 2019 (JP) ................................ 2019-154133

(51) Int. Cl.
*E02F 9/22* (2006.01)
*E02F 3/43* (2006.01)
(Continued)

(52) U.S. Cl.
CPC ............ *E02F 9/2228* (2013.01); *E02F 3/435* (2013.01); *E02F 9/2004* (2013.01);
(Continued)

(58) Field of Classification Search
CPC ....... F15B 13/02; E02F 9/2289; E02F 9/2275; E02F 9/2004
See application file for complete search history.

(56) References Cited

U.S. PATENT DOCUMENTS

2013/0312399 A1 11/2013 Hiraku et al.
2014/0366519 A1* 12/2014 Sadamori ............. E02F 9/2289 60/430

(Continued)

FOREIGN PATENT DOCUMENTS

EP 3 351 806 A1 7/2018
JP 11-141504 A 5/1999

(Continued)

OTHER PUBLICATIONS

International Preliminary Report on Patentability (PCT/IB/338 & PCT/IB/373) issued in PCT Application No. PCT/JP2020/032072 dated Mar. 10, 2022, including English translation of document C2 (Japanese-language Written Opinion (PCT/ISA/237) filed on Feb. 22, 2022) (five (5) pages).

(Continued)

*Primary Examiner* — Abiy Teka
(74) *Attorney, Agent, or Firm* — Crowell & Moring LLP

(57) ABSTRACT

Provided is a construction machine in which travel operability is not impaired when a combined operation is performed in which a single-rod hydraulic cylinder is driven during a travel operation. A hydraulic excavator includes a controller that controls the delivery direction and delivery flow rate of a closed-circuit pump, opens and closes a travel switching valve and an assist switching valve, and controls the delivery flow rate of the open-circuit pump, according to a travel operation lever and a work operation lever. The controller holds the assist switching valve in a closed position irrespective of whether or not the work operation lever is operated in a case where the travel operation lever is operated.

2 Claims, 6 Drawing Sheets

(51) Int. Cl.
*E02F 9/20* (2006.01)
*F15B 13/02* (2006.01)
*F15B 15/18* (2006.01)

(52) U.S. Cl.
CPC .......... *E02F 9/2203* (2013.01); *E02F 9/2271* (2013.01); *E02F 9/2275* (2013.01); *E02F 9/2289* (2013.01); *E02F 9/2292* (2013.01); *F15B 13/02* (2013.01); *F15B 15/18* (2013.01); *E02F 9/2296* (2013.01); *F15B 2211/426* (2013.01)

(56) References Cited

U.S. PATENT DOCUMENTS

| | | | | |
|---|---|---|---|---|
| 2015/0292526 | A1* | 10/2015 | Saitoh | E02F 9/2296 60/477 |
| 2016/0032565 | A1 | 2/2016 | Shimizu et al. | |
| 2016/0177539 | A1* | 6/2016 | Hiraku | F15B 11/10 60/428 |
| 2017/0073931 | A1 | 3/2017 | Hiraku et al. | |

FOREIGN PATENT DOCUMENTS

| | | | |
|---|---|---|---|
| JP | 2013-245787 | A | 12/2013 |
| JP | 2015-48899 | A | 3/2015 |
| JP | 2015-203453 | A | 11/2015 |
| JP | 2015-227544 | A | 12/2015 |
| JP | 2016-118281 | A | 6/2016 |

OTHER PUBLICATIONS

International Search Report (PCT/ISA/210) issued in PCT Application No. PCT/JP2020/032072 dated Oct. 27, 2020 with English translation (four (4) pages).

Japanese-language Written Opinion (PCT/ISA/237) issued in PCT Application No. PCT/JP2020/032072 dated Oct. 27, 2020 (three (3) pages).

Extended European Search Report issued in European Application No. 20858546.3 dated Jun. 28, 2023 (8 pages).

* cited by examiner

CONSTRUCTION MACHINE

TECHNICAL FIELD

The present invention relates to a construction machine in which a hydraulic closed circuit for driving a hydraulic actuator directly by a hydraulic pump is used, and particularly to a construction machine in which a hydraulic cylinder is driven by a hydraulic closed circuit.

BACKGROUND ART

In recent years, in construction machines such as a hydraulic excavator and a wheel loader, energy conservation has become an important development item. Energy conservation of the hydraulic system itself is important for energy conservation of a construction machine, and application of a hydraulic closed-circuit system in which a hydraulic actuator is directly controlled by a hydraulic pump by connecting through a closed circuit has been investigated. This system is free of pressure loss by a control valve, and is free of flow rate loss since only a required flow rate is delivered by a pump. In addition, it is possible to regenerate positional energy of an actuator and energy at the time of deceleration. Therefore, energy conservation is possible.

As a background art of a construction machine in which hydraulic closed circuits are combined, Patent Document 1 describes a configuration in which favorable operability can be secured even when a hydraulic closed-circuit system is mounted and a plurality of actuators are simultaneously put into a combined operation.

PRIOR ART DOCUMENT

Patent Document

Patent Document 1: JP-2015-48899-A

SUMMARY OF THE INVENTION

Problem to be Solved by the Invention

In the hydraulic driving system described in Patent Document 1, it is said that when a single-rod hydraulic cylinder is driven, favorable operability can be obtained by using a closed-circuit pump and an open-circuit pump in combination. However, Patent Document 1 does not refer to the influence on travel operability that occurs by driving of the single-rod hydraulic cylinder when a travel hydraulic motor is driven by an open-circuit pump.

The hydraulic driving system described in Patent Document 1 has a configuration in which the single-rod hydraulic cylinder is driven by use of a closed-circuit pump and an open-circuit pump in pair, and the travel hydraulic motor is driven by only the open-circuit pump.

In this configuration, when the single-rod hydraulic cylinder is driven during driving of the travel hydraulic motor by a plurality of open-circuit pumps, part of the open-circuit pumps having been driving the travel hydraulic motor is used for driving the single-rod hydraulic cylinder, so that traveling speed is largely lowered, and adverse effect on travel operability would be generated.

The present invention has been made in consideration of the above-mentioned problem. It is an object of the present invention to provide a construction machine in which travel operability is not impaired at the time of a combined operation of driving a single-rod hydraulic cylinder during a travel operation.

Means for Solving the Problem

In order to achieve the above object, the present invention provides a construction machine including: a travel body; a work device; a travel hydraulic motor that drives the travel body; at least one single-rod hydraulic cylinder that drives the work device; a travel operation lever for issuing an instruction on an operation of the travel hydraulic motor; a work operation lever for issuing an instruction on an operation of the single-rod hydraulic cylinder; a closed-circuit pump that is connected through a closed circuit to the single-rod hydraulic cylinder; a cap-side flow path that connects a delivery port on one side of the closed-circuit pump to a cap-side chamber of the single-rod hydraulic cylinder; a rod-side flow path that connects a delivery port on another side of the closed-circuit pump to a rod-side chamber of the single-rod hydraulic cylinder; an open-circuit pump; a travel flow rate control valve that controls flow rate supplied from the open-circuit pump to the travel hydraulic motor; a travel switching valve that is capable of opening and closing a travel flow path connecting a delivery port of the open-circuit pump to the travel flow rate control valve; an assist switching valve that is capable of opening and closing an assist flow path connecting the delivery port of the open-circuit pump to the cap-side flow path; and a controller that controls the delivery direction and delivery flow rate of the closed-circuit pump, opens and closes the travel switching valve and the assist switching valve, and controls the delivery flow rate of the open-circuit pump, according to operations of the travel operation lever and the work operation lever, wherein the controller is configured to hold the assist switching valve in a closed position irrespective of whether or not the work operation lever is operated in a case where the travel operation lever is operated.

According to the present invention configured as above, in a construction machine in which a single-rod hydraulic cylinder is driven by a combination of a closed-circuit pump and an open-circuit pump, when the single-rod hydraulic cylinder is driven during a travel operation, restriction is performed so as to drive the single-rod hydraulic cylinder by only the closed-circuit pump, whereby the open-circuit pump is occupied for driving the travel hydraulic motor. As a result, the traveling speed is not lowered even when the single-rod hydraulic cylinder is driven during a travel operation, thus travel operability is not impaired.

Advantages of the Invention

According to the present invention, in a construction machine configured to drive a single-rod hydraulic cylinder by a combination of a closed-circuit pump and an open-circuit pump, the problem that travel operability is impaired at the time of a combined operation of driving the single-rod hydraulic cylinder during a travel operation is eliminated.

MODES FOR CARRYING OUT THE INVENTION

Figure 1:
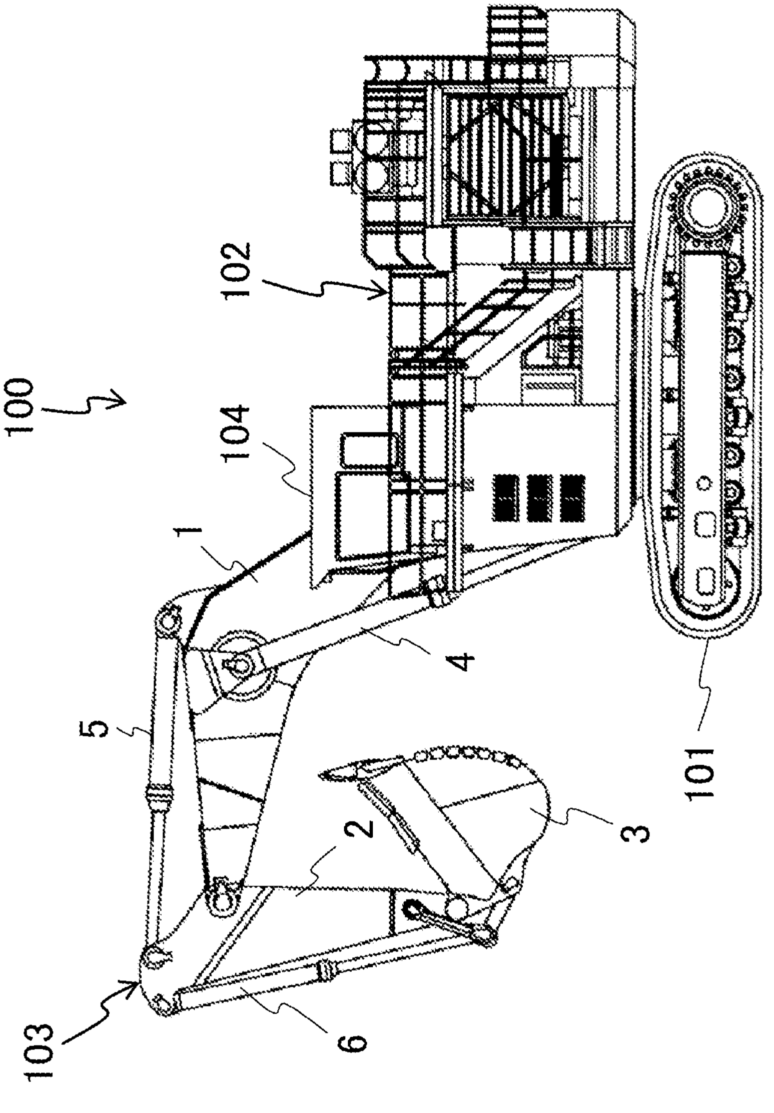
FIG. 1 is a side view of a hydraulic excavator according to an embodiment of the present invention.

An embodiment of the present invention will be described below referring to the drawings, while taking a large type hydraulic excavator as an example of a construction machine. Note in the drawings, equivalent members are denoted by the same reference symbols, and overlapping descriptions will be omitted, as required.

FIG. 1 is a side view of a hydraulic excavator according to the present embodiment.

In FIG. 1, a hydraulic excavator 100 includes a lower travel body 101 having crawler type travel devices on both of left and right sides, and an upper swing structure 102 swingably mounted to the lower travel body 101. The lower travel body 101 is driven by travel hydraulic motors 16*a* and 16*b* (depicted in FIG. 2). The upper swing structure 102 is driven by a swing hydraulic motor (not illustrated).

To the front side of the upper swing structure 102, a front device 103 as a work device for performing excavation and the like is mounted. The front device 103 includes a boom 1 connected to the front side of the upper swing structure 102 in a vertically rotatable manner, an arm 2 connected to a tip part of the boom 1 in the manner of being rotatable in the vertical direction and a front-rear direction, and a bucket 3 connected to a tip part of the arm 2 in the manner of being rotatable in the vertical direction and the front-rear direction. The boom 1, the arm 2, and the bucket 3 are driven respectively by a boom cylinder 4, an arm cylinder 5 and a bucket cylinder 6 which are single-rod hydraulic cylinders.

The upper swing structure 102 is provided with a cab 104 in which the operator rides. A travel operation lever 25*b* (depicted in FIG. 2) for issuing an instruction on an operation of the lower travel body 101 and work operation lever 25*a* (depicted in FIG. 2) for issuing instructions on operations of the boom 1, the arm 2, the bucket 3, and the upper swing structure 102, and the like are disposed in the cap 104.

Figure 2:
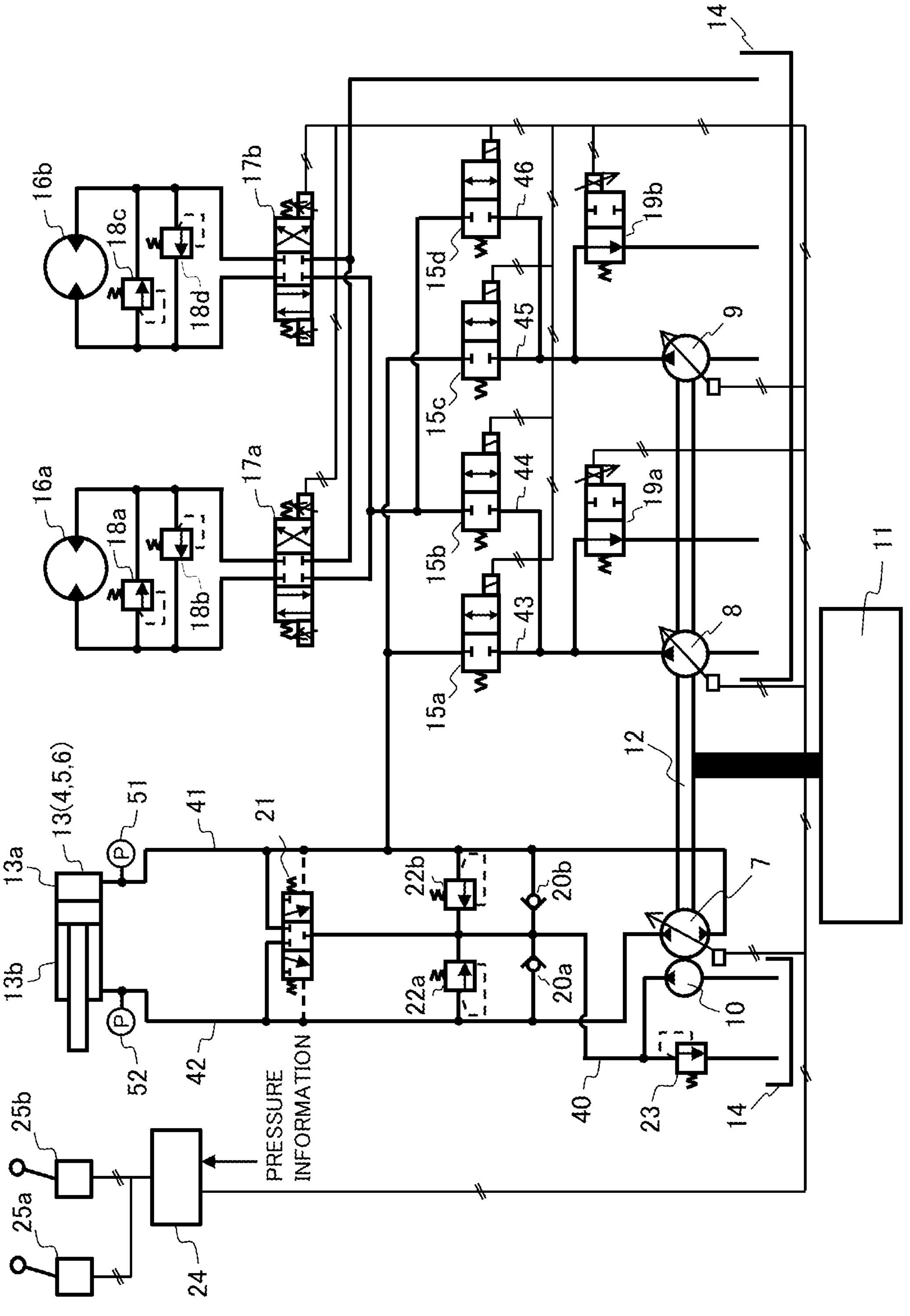
FIG. 2 is a hydraulic circuit diagram of the hydraulic excavator depicted in FIG. 1.

FIG. 2 is a hydraulic circuit diagram of the hydraulic excavator 100. Note that in FIG. 2, only parts concerning the driving of the hydraulic cylinders 4, 5, and 6 (in the figure, representatively depicted by a hydraulic cylinder 13) and the travel hydraulic motors 16*a* and 16*b* are depicted, and parts concerning the driving of other actuators are omitted.

In FIG. 2, a closed-circuit pump 7 which is a bidirectionally tiltable variable displacement pump, open-circuit pumps 8 and 9 which are unidirectionally tiltable variable displacement pumps, and a charge pump 10 which is a unidirectionally tiltable fixed displacement pump are driven by receiving power from a power source 11 through a transmission 12.

The closed-circuit pump 7 has a delivery port on one side connected to a cap-side chamber 13*a* of the hydraulic cylinder 13 through a cap-side flow path 41, has a delivery port on the other side connected to a rod-side chamber 13*b* of the hydraulic cylinder 13 through a rod-side flow path 42, and constitutes a closed circuit. The closed-circuit pump 7 sucks an oil from one of the cap-side flow path 41 and the rod-side flow path 42, and delivers the oil to the other one.

The open-circuit pumps 8 and 9 suck the oil from an oil tank 14, deliver the oil to the cap-side chamber 13*a* of the hydraulic cylinder 13 through assist flow paths 43 and 45 and assist switching valves 15*a* and 15*c*, and deliver the oil to travel hydraulic motors 16*a* and 16*b* through travel flow paths 44 and 46 and travel switching valves 15*b* and 15*d*.

Travel flow rate control valves 17*a* and 17*b* are provided on flow paths connecting the travel switching valves 15*b* and 15*d* and the travel hydraulic motors 16*a* and 16*b*, and control flow rates supplied from the open-circuit pumps 8 and 9 to the travel hydraulic motors 16*a* and 16*b*.

Relief valves 18*a*, 18*b*, 18*c*, and 18*d* are provided on flow paths connecting the travel hydraulic motors 16*a* and 16*b* and the travel flow rate control valves 17*a* and 17*b*, and relieve the oil from a high pressure side flow path to a low pressure side flow path to protect the circuit when the pressure difference between two ports possessed by the travel hydraulic motors 16*a* and 16*b* becomes equal to or more than a predetermined pressure.

Breed-off valves 19*a* and 19*b* are provided on flow paths branched from delivery flow paths of the open-circuit pumps 8 and 9, and discharges the oil delivered from the open-circuit pumps 8 and 9 to the oil tank 14 according to the opening degree.

The charge pump 10 sucks the oil from the oil tank 14, and delivers the oil to a charge flow path 40.

Check valves 20*a* and 20*b* are provided between the cap-side flow path 41 and the rod-side flow path 42 and the charge flow path 40, and completes the oil from the charge oil path 40 to the cap-side flow path 41 and the rod-side flow path 42.

A flushing valve 21 is provided between the cap-side flow path 41 and the rod-side flow path 42 and the charge flow path 40, and discharges surplus oil on the lower-pressure side of either the cap-side flow path 41 or the rod-side flow path 42 to the charge flow path 40.

Main relief valves 22*a* and 22*b* are provided between the cap-side flow path 41 and the rod-side flow path 42 and the charge flow path 40, and set a maximum pressure of the cap-side flow path 41 and the rod-side flow path 42.

A charge relief valve 23 is provided between the charge flow path 40 and the oil tank 14, and sets a maximum pressure of the charge pump 10.

Pressure sensors 51 and 52 are provided respectively on the cap-side flow path 41 and the rod-side flow path 42, detect the pressures in the cap-side chamber 13*a* and the rod-side chamber 13*b* of the hydraulic cylinder 13, and output pressure signals to the controller 24.

The controller 24 computes and outputs commands for the closed-circuit pump 7, the open-circuit pumps 8 and 9, the switching valves 15*a*, 15*b*, 15*c*, and 15*d*, the travel flow rate control valves 17*a* and 17*b*, and the breed-off valves 19*a* and 19*b*, based on operation amounts of the operation levers 25*a* and 25*b* and pressure information from the pressure sensors 51 and 52, and the like.

As depicted in FIG. 2, in a standby state, the switching valves 15*a*, 15*b*, 15*c*, and 15*d* and the travel flow rate control valves 17*a* and 17*b* are in closed positions, and hold the pressure in the circuit. In addition, the breed-off valves 19*a* and 19*b* are in open positions, and relieve standby flow rates of the open-circuit pumps 8 and 9 to the oil tank 14, thereby preventing the pressure from rising.

Figure 3:
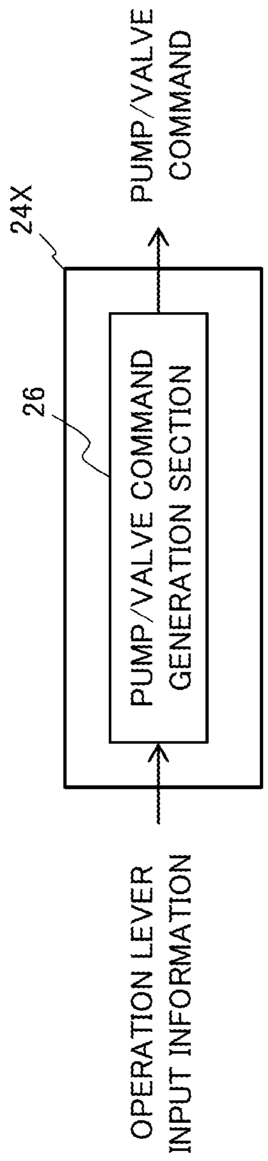
FIG. 3 is a functional block diagram of a conventional controller.

FIG. 3 is a functional block diagram of a conventional controller. As depicted in FIG. 3, a conventional controller 24X includes a pump/valve command generation section 26. The pump/valve command generation section 26 computes commands (pump/valve commands) for pumps and valves according to input information from the operation levers 25*a* and 25*b*, and outputs the commands to the pumps and valves.

Figure 4:
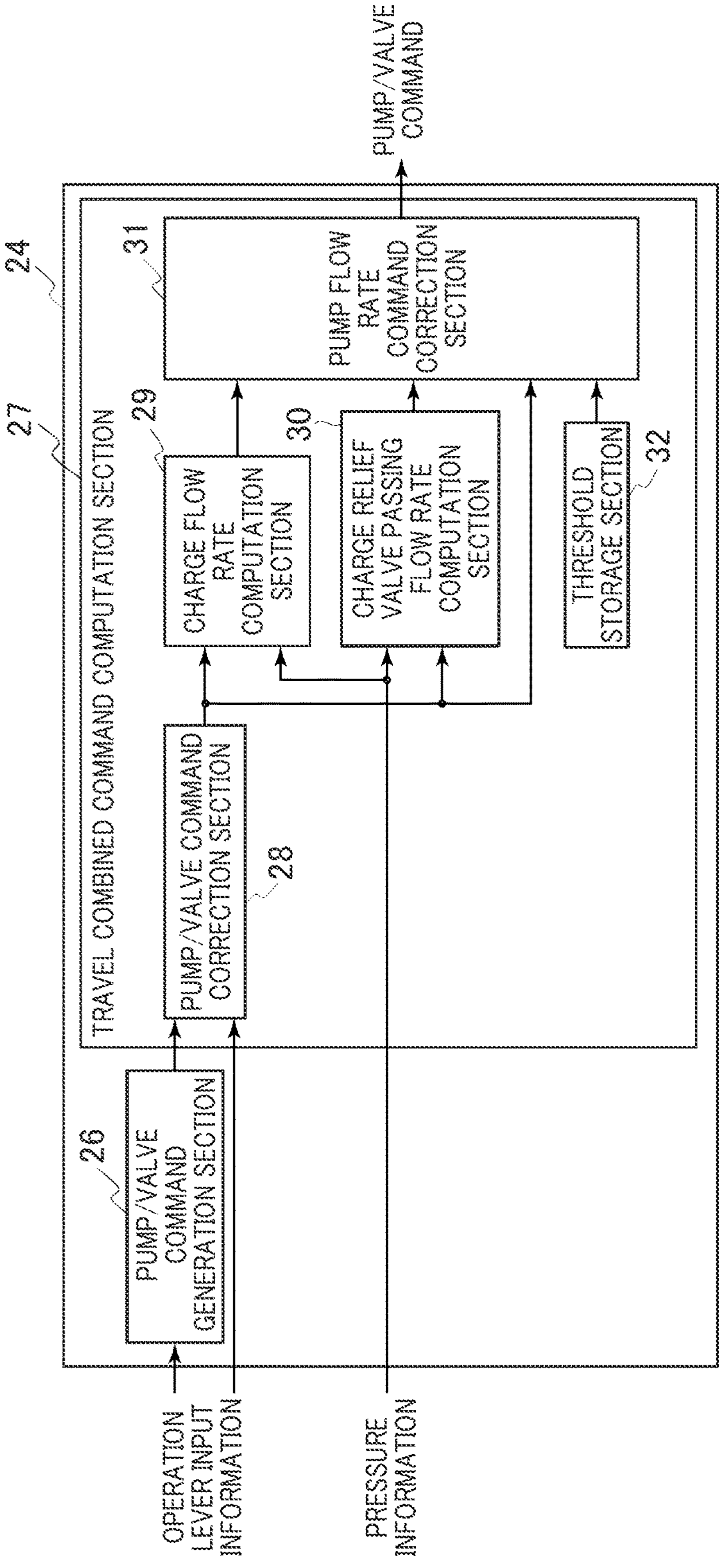
FIG. 4 is a functional block diagram of a controller depicted in FIG. 2.

FIG. 4 is a functional block diagram of the controller 24 in the present embodiment. As depicted in FIG. 4, the controller 24 in the present embodiment includes a travel combined command computation section 27 in addition to the pump/valve command generation section 26. The travel combined command computation section 27 corrects the pump/valve commands computed by the pump/valve command generation section 26 on the basis of operation lever information and pressure information concerning the hydraulic cylinder 13, and outputs the corrected commands to the pumps and valves. The travel combined command computation section 27 includes a pump/valve command correction section 28, a charge flow rate computation section 29, a charge relief valve passing flow rate computation section 30, a pump flow rate command correction section 31, and a threshold storage section 32.

The pump/valve command correction section 28 corrects the commands for the assist switching valves 15*a* and 15*c* of the pump/valve commands upon detecting an operation of the travel operation lever 25*b*, and outputs the corrected pump/valve commands to the charge flow rate computation section 29, the charge relief valve passing flow rate computation section 30, and the pump flow rate command correction section 31.

The charge flow rate computation section 29 computes a charge flow rate based on the pump/valve commands and pressure information concerning the hydraulic cylinder 13, and outputs the charge flow rate to the pump flow rate command correction section 31. The charge flow rate here is a flow rate obtained by subtracting the flow rate which the hydraulic cylinder 13 (4, 5, 6) delivers into the charge flow path 40 from the flow rate which the hydraulic cylinder 13 (4, 5, 6) absorbs from the charge flow path 40 (the flow rate which the hydraulic cylinders 13 (4, 5, and 6) as a whole absorb from the charge flow path 40).

The charge relief valve passing flow rate computation section 30 computes a charge relief valve passing flow rate based on the pump/valve commands and pressure information concerning the hydraulic cylinder 13, and outputs the charge relief valve passing flow rate to the pump flow rate command correction section 31. The charge relief valve passing flow rate here is a flow rate discharged to the oil tank 14 through the charge relief valve 23, and is a flow rate obtained by subtracting the flow rate which the hydraulic cylinder 13 (4, 5, 6) absorbs from the charge flow path 40 from the sum of the delivery flow rate of the charge pump 10 and the flow rate which the hydraulic cylinder 13 (4, 5, 6) delivers into the charge flow path 40.

The pump flow rate command correction section 31 corrects the delivery flow rate of the closed-circuit pump 7 of the pump/valve commands to the reduction side when the charge flow rate exceeds a threshold or when the charge relief valve passing flow rate exceeds a threshold, and outputs the corrected pump/valve command to the pumps and valves. The thresholds here are stored in the threshold storage section 32.

Figure 5:
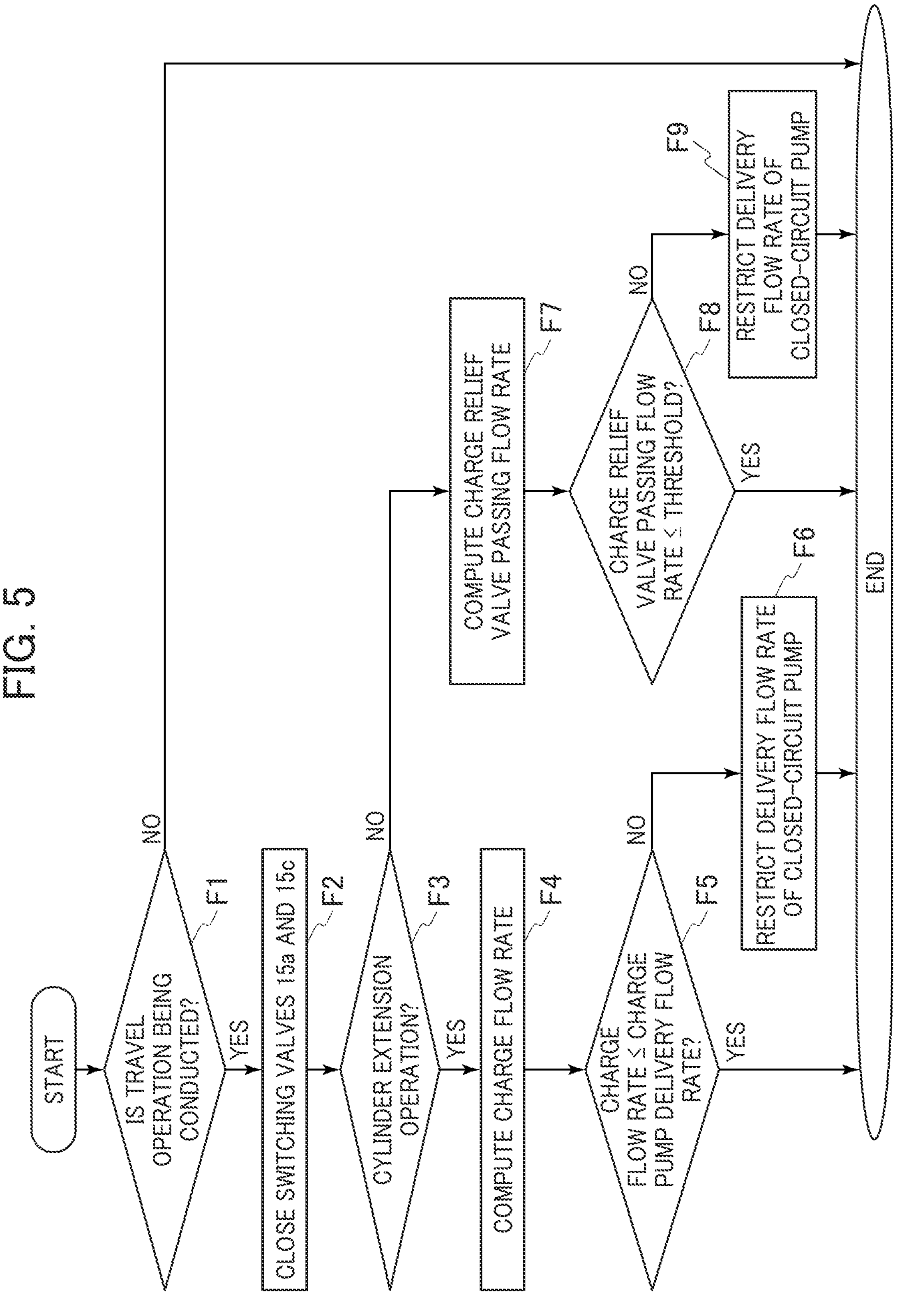
FIG. 5 is a flow chart of the controller depicted in FIG. 2.

FIG. 5 is a flow chart depicting processing in one control period of the travel combined command computation section 27. The processing will be described sequentially below.

First, whether or not a travel operation is being conducted is determined based on input information concerning the travel operation lever 25*b* (processing F1).

When it is determined in the processing F1 that a travel operation is not being conducted (NO), the flow is finished.

When it is determined in the processing F1 that the travel operation is being conducted (YES), the assist switching valves 15*a* and 15*c* are closed (processing F2).

Following to the processing F2, it is determined whether or not a cylinder extension operation is being conducted on the basis of input information concerning a work operation lever 25*a* (processing F3).

When it is determined in the processing F3 that a cylinder extension operation is being conducted (YES), the charge flow rate is computed (processing F4).

Following to the processing F4, it is determined whether or not the charge flow rate is equal to or less than the delivery flow rate of the charge pump 10 (processing F5).

When it is determined in the processing F5 that the charge flow rate is equal to or less than the delivery flow rate of the charge pump 10 (YES), the flow is finished.

When it is determined in the processing F5 that the charge flow rate is more than the delivery flow rate of the charge pump 10 (NO), the delivery flow rate of the closed-circuit pump 7 driving the hydraulic cylinder 13 is restricted such that the charge flow rate becomes equal to or less than the delivery flow rate of the charge pump 10, and the flow is finished.

When it is determined in the processing F3 that the cylinder extension operation is not being conducted (NO), the charge relief valve passing flow rate is computed (processing F7).

Following to the processing F7, it is determined whether or not the charge relief valve passing flow rate is equal to or less than a threshold (processing F8). A method of setting the threshold will be described later.

When it is determined in the processing F8 that the charge relief valve passing flow rate is equal to or less than the threshold (YES), the flow is finished.

When it is determined in the processing F8 that the charge relief valve passing flow rate is more than the threshold (NO), the delivery flow rate of the closed-circuit pump 7 driving the hydraulic cylinder 13 is restricted such that the charge relief flow rate becomes equal to or less than the threshold, and the flow is finished.

Next, referring to FIGS. 2 to 5, a basic operation of the hydraulic excavator 100 and advantageous effects of the present invention will be described.

(Single Driving of Cylinder)

In the case of operating the work operation lever 25*a* and singularly operating only the hydraulic cylinder 13, the controller 24 outputs flow commands for the closed-circuit pump 7 and the open-circuit pump 8, an opening command for the switching valve 15*a* and a closing command for the breed-off valve 19*a* and drives the hydraulic cylinder 13, according to the operation amount of the work operation lever 25*a*. In this instance, let the delivery flow rate of the closed-circuit pump 7 be Qcp, let the delivery flow rate of the open-circuit pump 8 be Qop, let the pressure receiving area of a cap-side chamber of the hydraulic cylinder 13 be Acap, and let the pressure receiving area of a rod-side chamber be Arod, then Qcp and Qop are determined such that the pump flow rate ratio (Qcp+Qop):Qcp becomes equal to the pressure receiving area ratio Acap:Arod. The controller 24 performs a control such that the delivery flow rate ratio of the closed-circuit pump 7 to the open-circuit pump 8 varies while keeping Qcp:Qop. In this way, at the time of driving the hydraulic cylinder 13, the closed-circuit pump 7 and the open-circuit pump 8 are used in combination.

(Single Driving of Travel)

In FIG. 2, in the case of operating the travel operation lever 25*b* and driving the travel hydraulic motors 16*a* and 16*b* to perform a travel operation, the controller 24 outputs flow rate commands for the open-circuit pumps 8 and 9, opening commands for the travel switching valves 15*b* and 15*d*, closing commands for the breed-off valves 19*a* and 19*b*, and opening commands for the travel flow rate control valves 17*a* and 17*b* and drives the travel hydraulic motors 16*a* and 1*b*, according to an operation amount of the travel operation lever 25*b*. In this way, at the time of a travel operation, only the open-circuit pumps 8 and 9 are used.

(Travel+Cylinder Driving)

In FIG. 2, in the case of operating the work operation lever 25*a* and further operating the hydraulic cylinder 13 while operating the travel operation lever 25*b* and performing a travel operation, the conventional controller 24X (depicted in FIG. 3) sets a flow rate command for the open-circuit pump 8 to 0, outputs a closing command to the travel switching valve 15*b* and an opening command to the breed-off valve 19*a*, thereafter outputs flow rate commands for the closed-circuit pump 7 and the open-circuit pump 8, an opening command for the assist switching valve 15*a*, and a closing command for the breed-off valve 19*a*, and controls the hydraulic cylinder 13 and the travel hydraulic motors 16*a* and 16*b*.

In this way, in the case of performing a cylinder operation during a travel operation, the hydraulic cylinder 13 is operated by the closed-circuit pump 7 and the open-circuit pump 8 and, simultaneously, travel is operated by the open-circuit pump 9, whereby a combined operability is secured. However, since the hydraulic cylinder 13 is operated while the travel hydraulic motors 16*a* and 16*b* are originally driven by the open-circuit pumps 8 and 9, the open-circuit pump 8 having been used for travel is used for driving the hydraulic cylinder 13. As a result, the pump which can be used for travel is only the open-circuit pump 9, so that traveling speed is largely lowered, and travel operability is conspicuously impaired.

In view of this, processing by a travel combined command computation section 27 provided in the controller 24 according to the present embodiment depicted in FIG. 4 is performed. In the processing F1 of FIG. 5, it is determined whether or not a travel operation is being conducted on the basis of an operation amount of the travel operation lever 25*b*. In the processing F2, the pump for driving the hydraulic cylinder 13 is restricted to only the closed-circuit pump 7 when it is determined in the processing F1 that a travel operation is being conducted. As a result, the open-circuit pumps 8 and 9 can be occupied for driving the travel hydraulic motors 16*a* and 16*b* during a travel operation, so that even if the hydraulic cylinder 13 is operated during the travel operation, the traveling speed is not lowered, and the travel operability is not impaired.

Here, the case where the hydraulic cylinder 13 is driven by only the closed-circuit pump 7 will be described.

In the case where the hydraulic cylinder 13 is operated in the extending direction, let the pressure receiving area ratio of the hydraulic cylinder 13 be Acap:Arod=2:1, then the relation between the flow rate Qcap flowing into the cap-side chamber of the hydraulic cylinder 13 and the flow rate Qrod flowing out from the rod-side chamber is Qcap=2Qrod, so that flow rate balance in the closed circuit cannot be secured, and flow rate insufficiency would be generated in a lower pressure side flow path of either the cap-side flow path 41 or the rod-side flow path 42. In this instance, the oil is replenished from the charge pump 10 into the flow path, where flow rate insufficiency has been generated through the check valve 20*a* or the check valve 20*n*, but, when the replenished flow rate is more than the flow rate flowing into the charge flow path 40, the pressure in the charge flow path 40 (hereinafter, charge pressure) would be lowered, this may lower the reliability such that cavitation is generated to damage the apparatus.

In view of this, the charge flow rate is computed in the processing F4 from an operation amount of the work operation lever 25*a*, pressure information concerning the pressure sensors 51 and 52, and the like, and it is determined in the processing F5 whether or not the charge flow rate (the flow rate which the hydraulic cylinders 13 (4, 5, 6) as a whole absorb from the charge flow path 40) is equal to or less than the charge pump delivery flow rate. When it is determined in the processing F5 that the charge flow rate is more than the charge pump delivery flow rate, the delivery flow rate of the closed-circuit pump 7 is restricted in the processing F6 until the charge flow rate becomes equal to or less than the charge pump delivery flow rate. As a result, a lowering in the charge pressure can be restrained, and a lowering in reliability can be prevented.

In the case where the hydraulic cylinder 13 is operated in a contracting direction, like in the case where the hydraulic cylinder 13 is operated in the extending direction, the flow rate balance in the closed circuit cannot be secured; in this case, however, a surplus oil is generated on the lower pressure side of either the cap-side flow path 41 or the rod-side flow path 42 of the hydraulic cylinder 13, and the surplus oil in the closed circuit is discharged to the charge flow path 40 through the flushing valve 21. In this instance, with the charge line entering flow rate increased, the passing flow rate through the charge relief valve 23 increases, and the charge pressure is increased due to the pressure override characteristics of the charge relief valve 23. When the charge pressure increases, the load on the charge pump 10 increases, adversely influencing the fuel cost, and, since the maximum pressure in the hydraulic cylinder 13 is defined by the main relief valves 22*a* and 22*b*, the pressure difference between the cap-side chamber 13*a* and the rod-side chamber 13*b* of the hydraulic cylinder 13 is reduced, so that thrust force of the hydraulic cylinder 13 is lowered, and operability is lowered.

Figure 6:
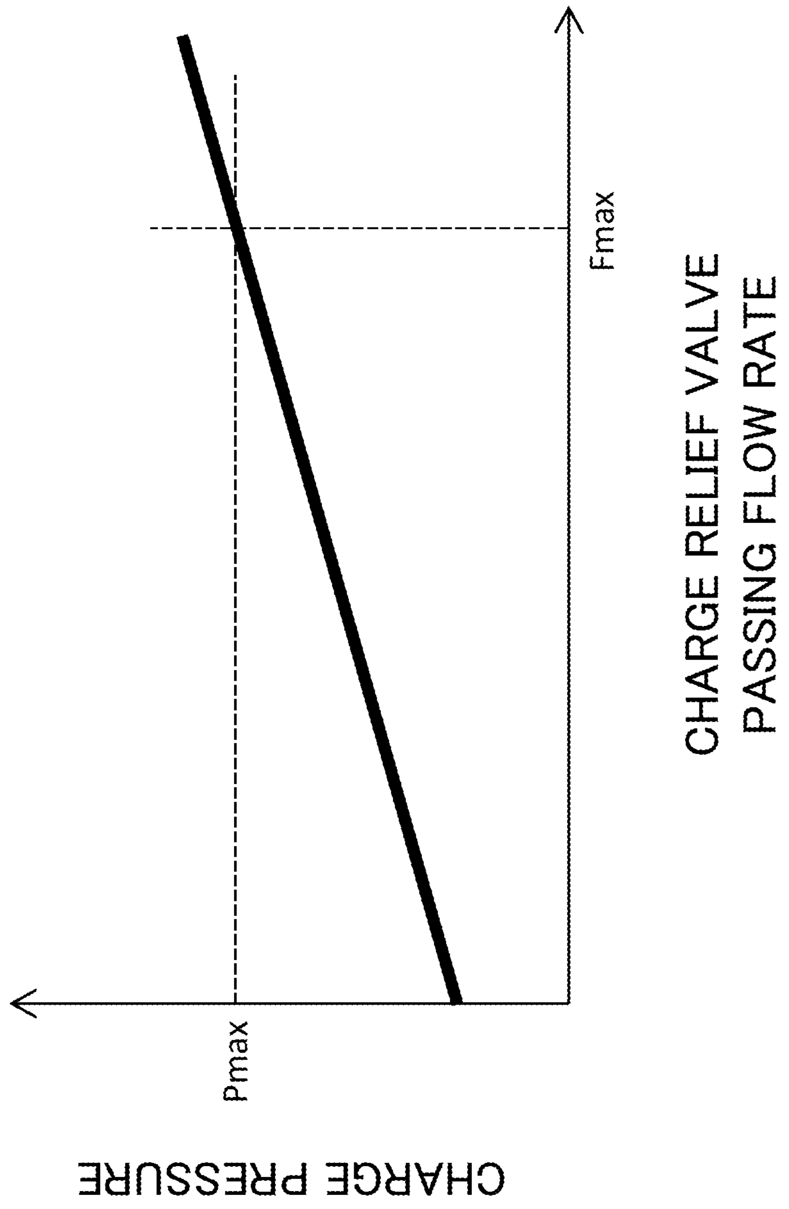
FIG. 6 is a diagram depicting pressure override characteristics of a charge relief valve depicted in FIG. 2.

In view of this, it is determined in processing F8 whether or not the charge relief valve passing flow rate is equal to or less than a threshold, and, when the charge relief valve passing flow rate is more than the threshold, the delivery flow rate of the closed-circuit pump 7 is restricted in processing F9 such that the charge relief valve passing flow rate becomes equal to or less than the threshold. As a result, the charge pressure can be restrained from rising, and worsening of the fuel cost and operability can be prevented. The threshold here is determined based on the pressure override characteristics of the charge relief valve 23 depicted in FIG. 6. Specifically, the threshold is set at a value equal to or less than the charge relief valve passing flow rate Fmax when the charge pressure reaches a maximum allowable pressure Pmax. The maximum allowable pressure Pmax is determined within a range such that the fuel cost and operability are not influenced. For example, in the case where a target value of the charge pressure is 2 MPa, the threshold is set on the order of 3 MPa.

SUMMARY

In the present embodiment, in the hydraulic excavator 100 including the travel body 101, the work device 103, the travel hydraulic motors 16*a* and 16*b* that drives the travel body 101, at least one single-rod hydraulic cylinder 13 (4, 5, 6) that drives the work device 103, the travel operation lever 25*b* that issues instructions on operations of the travel hydraulic motors 16*a* and 16*b*, the work operation lever 25*a* that issues an instruction on an operation of the single-rod hydraulic cylinder 13 (4, 5, 6), the closed-circuit pump 7 connected through closed circuit to the single-rod hydraulic cylinder 13 (4, 5, 6), the cap-side flow path 41 that connects the delivery port on one side of the closed-circuit pump 7 to the cap-side chamber 13*a* of the single-rod hydraulic cylinder 13 (4, 5, 6), the rod-side flow path 42 that connects the delivery port on the other side of the closed-circuit pump 7 to the rod-side chamber 13*b* of the single-rod hydraulic cylinder 13 (4, 5, 6), the open-circuit pumps 8 and 9, the travel flow rate control valves 17*a* and 17*b* that control the flow rate supplied from the open-circuit pumps 8 and 9 to the travel hydraulic motors 16*a* and 16*b*, the travel switching valves 15*a* and 15*b* capable of opening and closing the travel flow paths 44 and 46 that connect the delivery ports of the open-circuit pumps 8 and 9 to the travel flow rate control valves 17*a* and 17*b*, the assist switching valves 15*a* and 15*b* capable of opening and closing the assist flow paths 43 and 45 that connect the delivery ports of the open-circuit pumps 8 and 9 to the cap-side flow path 41, and the controller 24 that controls the delivery direction and delivery flow rate of the closed-circuit pump 7, opens and closes the travel switching valves 15*b* and 15*d* and the assist switching valves 15*a* and 15*c*, and controls the delivery flow rates of the open-circuit pumps 8 and 9, according to operations of the travel operation lever 25*b* and the work operation lever 25*a*, wherein the controller 24 is configured to hold the assist switching valves 15*a* and 15*c* in closed positions irrespective of whether or not the work operation lever 25*a* is operated in a case where the travel operation lever 25*b* is operated.

According to the present embodiment configured as above, in the hydraulic excavator 100 having a configuration in which the single-rod hydraulic cylinder 13 (4, 5, 6) is driven by a combination of the closed-circuit pump 7 and the open-circuit pumps 8 and 9, the single-rod hydraulic cylinder 13 (4, 5, 6) is restricted to be driven by only the closed-circuit pump 7 when the single-rod hydraulic cylinder 13 (4, 5, 6) is driven during a travel operation, whereby the open-circuit pumps 8 and 9 are occupied for driving the travel hydraulic motors 16*a* and 16*b*. As a result, even when the single-rod hydraulic cylinder 13 (4, 5, 6) is driven during a travel operation, the traveling speed is not lowered, so that travel operability is not impaired.

In addition, the hydraulic excavator 100 according to the present embodiment includes the charge pump 10, the charge flow path 40 connected to the delivery port of the charge pump 10, the charge relief valve 23 provided in the charge flow path 40, the check valves 20*a* and 20*b* provided between the cap-side flow path 41 and the rod-side flow path 42 and the charge flow path 40, and the flushing valve 21 provided between the cap-side flow path 41 and the rod-side flow path 42 and the charge flow path 40, and the controller 24 corrects the delivery flow rate of the closed-circuit pump 7 such that the charge flow rate obtained by subtracting the flow rate that the single-rod hydraulic cylinder 13 (4, 5, 6) discharges into the charge flow path 40 from the flow rate which the single-rod hydraulic cylinder 13 (4, 5, 6) absorbs from the charge flow path 40 becomes equal to or less than the delivery flow rate of the charge pump 10. As a result, the charge pressure is restrained from being lowered, so that reliability can be prevented from being lowered due to cavitation.

Besides, the controller 24 corrects the delivery flow rate of the closed-circuit pump 7 such that the passing flow rate through the charge relief valve 23 obtained by subtracting the flow rate which the single-rod hydraulic cylinder 13 (4, 5, 6) absorbs from the charge flow path 40 from the sum of the flow rate the single-rod hydraulic cylinder 13 (4, 5, 6) discharges into the charge flow rate 40 and the delivery flow rate of the charge pump 10 becomes equal to or less than a predetermined flow rate. As a result, a rise in the charge pressure is restrained, and, therefore, worsening of operability due to a lowering in thrust force of the hydraulic cylinder 13 (4, 5, 6) and worsening of fuel cost due to an increase in the load on the charge pump 10 can be prevented.

While the embodiment of the present invention has been described in detail above, the present invention is not limited to the above-described embodiment, and includes various modifications. For example, the above embodiment has been described in detail for easily understandably explaining the present invention, and all the configurations described above may not necessarily be included.

DESCRIPTION OF REFERENCE SYMBOLS

- 1: Boom
- 2: Arm
- 3: Bucket
- 4: Boom cylinder (single-rod hydraulic cylinder)
- 5: Arm cylinder (single-rod hydraulic cylinder)
- 6: Bucket cylinder (single-rod hydraulic cylinder)
- 7: Closed-circuit pump
- 8, 9: Open-circuit pump
- 10: Charge pump
- 11: Power source
- 12: Transmission
- 13: Hydraulic cylinder (single-rod hydraulic cylinder)
- 13*a*: Cap-side chamber
- 13*b*: Rod-side chamber
- 14: Oil tank
- 15*a*, 15*c*: Assist switching valve
- 15*b*, 15*d*: Travel switching valve
- 16*a*, 16*b*: Travel hydraulic motor
- 17*a*, 17*b*; Travel flow rate control valve
- 18*a*, 18*b*, 18*c*, 18*d*: Relief valve
- 19*a*, 19*b*: Breed-off valve
- 20*a*, 20*b*: Check valve
- 21: Flushing valve
- 22*a*, 22*b*: Main relief valve
- 23: Charge relief valve
- 24: Controller
- 25*a*: Work operation lever
- 25*b*: Travel operation lever
- 28: Pump/valve command correction section
- 29: Charge flow rate computation section
- 30: Charge relief valve passing flow rate computation section
- 31: Pump flow rate command correction section
- 32: Threshold storage section
- 40: Charge flow path
- 41: Cap-side flow path
- 42: Rod-side flow path
- 43, 45: Assist flow path
- 44, 46: Travel flow path
- 51, 52: Pressure sensor
- 100: Hydraulic excavator (construction machine)
- 101: Lower travel body (travel body)
- 102: Upper swing structure
- 103: Front device (work device)
- 104: Cab

The invention claimed is:

1. A construction machine comprising:

a travel body;

a work device;

a travel hydraulic motor that drives the travel body;

at least one single-rod hydraulic cylinder that drives the work device;

a travel operation lever for issuing an instruction on an operation of the travel hydraulic motor;

a work operation lever for issuing an instruction on an operation of the single-rod hydraulic cylinder;

a closed-circuit pump that is connected through a closed circuit to the single-rod hydraulic cylinder;

a cap-side flow path that connects a delivery port on one side of the closed-circuit pump to a cap-side chamber of the single-rod hydraulic cylinder;

a rod-side flow path that connects a delivery port on another side of the closed-circuit pump to a rod-side chamber of the single-rod hydraulic cylinder;

an open-circuit pump;

a travel flow rate control valve that controls flow rate supplied from the open-circuit pump to the travel hydraulic motor;

a travel switching valve that is capable of opening and closing a travel flow path connecting a delivery port of the open-circuit pump to the travel flow rate control valve;

an assist switching valve that is capable of opening and closing an assist flow path connecting the delivery port of the open-circuit pump to the cap-side flow path;

a controller that controls the delivery direction and delivery flow rate of the closed-circuit pump, opens and closes the travel switching valve and the assist switching valve, and controls the delivery flow rate of the open-circuit pump, according to operations of the travel operation lever and the work operation lever;

a charge pump;

a charge flow path connected to a delivery port of the charge pump;

a charge relief valve provided in the charge flow path;

a check valve provided between the cap-side flow path and the rod-side flow path and the charge flow path; and a flushing valve provided between the cap-side flow path and the rod-side flow path and the charge flow path, wherein the controller is configured to:

hold the assist switching valve in a closed position irrespective of whether or not the work operation lever is operated in a case where the travel operation lever is operated, and correct the delivery flow rate of the closed-circuit pump such that the passing flow rate through the charge relief valve obtained by subtracting the flow rate which the single-rod hydraulic cylinder absorbs from the charge flow path from the sum of the flow rate which the single-rod hydraulic cylinder discharges into the charge flow path and the delivery flow rate of the charge pump becomes equal to or less than a predetermined flow rate.

2. The construction machine according to claim 1, wherein the controller is configured to correct the delivery flow rate of the closed-circuit pump such that a charge flow rate obtained by subtracting the flow rate which the single-rod hydraulic cylinder discharges into the charge flow path from the flow rate which the single-rod hydraulic cylinder absorbs from the charge flow path becomes equal to or less than the delivery flow rate of the charge pump.

* * * * *